United States Patent [19]

Fultz

[11] 4,078,173

[45] Mar. 7, 1978

[54] LIGHT AMPLITUDE CONTROL SYSTEM FOR POSITION AND MOTION TRANSDUCERS

[75] Inventor: Jack V. Fultz, Thousand Oaks, Calif.

[73] Assignee: Pertec Computer Corporation, Los Angeles, Calif.

[21] Appl. No.: 699,248

[22] Filed: Jun. 24, 1976

[51] Int. Cl.² .............................................. H01J 3/14
[52] U.S. Cl. ............................... 250/237 G; 250/205; 356/169
[58] Field of Search ............. 250/537 G, 231 SE, 205, 250/204; 356/169; 324/175

[56] References Cited

U.S. PATENT DOCUMENTS

| | | | |
|---|---|---|---|
| 3,427,463 | 2/1969 | Weyrauch | 250/237 G |
| 3,639,768 | 2/1972 | Mancini | 250/205 |
| 3,670,202 | 6/1972 | Paine et al. | 250/205 X |
| 3,912,926 | 10/1975 | Coulbourn | 250/231 SE |
| 3,983,390 | 9/1976 | Llop | 250/237 G X |

Primary Examiner—David C. Nelms
Assistant Examiner—Vincent J. Sunderdick
Attorney, Agent, or Firm—Lindenberg, Freilich, Hornbaker, Wasserman, Rosen & Fernandez

[57] ABSTRACT

An opto-electronic transducer for determining position and/or velocity of one member with respect to another member is provided with light amplitude control. The transducer is comprised of a scale with a transmission grating on a first track and an indexing bar near each end of a second track adjacent the first, and a reticle with two sections of the same grating, one section being offset spatially one quarter cycle with respect to the other section for producing quadrature signals through two photosensors opposite the first track from which relative position and/or velocity between the reticle and the scale can be determined. A slit is provided in the reticle in order to provide information for determining position relative to the indexing bars. A single photosensor opposite the second track is used both to detect the indexing bars and to provide a feedback control signal to maintain the amplitude of light illuminating the scale and reticle constant.

16 Claims, 4 Drawing Figures

LIGHT AMPLITUDE CONTROL SYSTEM FOR POSITION AND MOTION TRANSDUCERS

BACKGROUND OF THE INVENTION

This invention relates to opto-electronic encoders, and more particularly to transducers useful in determining position and/or velocity of one member with respect to another member.

In the past, opto-electronic encoders have been devised for determining position (angular or linear) in the form of binary coded tracks wherein the full extent of possible positions (i.e., the full extent of travel of one element with respect to another) is divided into two parts. Another track is divided into four parts, and so forth, the nut track being divided into $2^n$ parts, with alternate parts of each track being opaque and the other parts transparent. A separate one of "$n$" photosensors is provided over each track to sense light transmitted from a source on the other side. The light detected at any given time by the group of $n$ photosensors indicates in binary coded form position or extent of travel from a zero (reference) position with a degree of resolution that the length of the divided parts in the $n$th track bears to the total extent of possible travel. The static output of such a group of photosensors could be arranged in any other known binary code, such as the reflected binary or Gray code, by simply rearranging the separate parts of the tracks relative to each other.

The "$n$" track encoder offers a direct bit-parallel fully encoded output but accomplishes this through substantial numbers of photosensors and associated electronic circuits. In some applications such cost and complexity is not justified. It is often desirable to determine position by counting up cycles during motion in one direction and counting down cycles during motion in the opposite direction, starting with zero at a reference position. An advantage in determining position in that manner is that one track yields position data and if necessary velocity data. It is sometimes necessary to determine velocity as well as position.

A measure of velocity in the single track encoder is the rate at which the photosensor output of the position track makes excursions between maximum and minimum. Systems where velocity is determined from that rate by effectively counting cycles per unit time are not restricted however to single track arrangements. In the multi-track encoder previously described, the rate of change of code from the $n$th track can be used as a measure of velocity.

In general, the lowest cost and greatest reliability will be obtained with the least number of tracks and photosensors.

Regardless of the number of tracks or photosensors employed, it is necessary to assure in some manner or by some means that a relatively constant peak amplitude output signal is developed by the photosensor as the relative position of the moving element to the stationary element varies over the width of one opaque part and an adjacent transparent part. Since the photosensor output may be proportional to incident light, a constant amplitude may not be maintained without some means for controlling the light source intensity. This is particularly true in the case of a light emitting diode (LED) since the intensity of the light produced is highly dependent on applied current and device temperature as well as device age.

This need to provide some means of controlling the light source intensity has heretofore been recognized in various types of systems. Representative systems are disclosed in U.S. Pat. Nos. 3,775,617, and 3,809,895. In the first of these patents, a servo-indicator dedicates a second photosensor to continually monitor the intensity of light from an incandescent lamp and thereby provide a signal for controlling the intensity of the light source. In the second of these patents the output signals of a plurality of photosensors (employed in a system for measuring relative displacement of a scale) are combined linearly to provide a control signal the mean value of which is representative of the intensity of light radiated by a source, thus effectively monitoring the intensity of light from a source without dedicating a photosensor for that purpose. However, that technique is useful in only the particular arrangements disclosed of photosensors disposed along the line of relative scale motion, and phase displaced such that only one is receiving full radiation while all others receive only partial radiation. Still another displacement measuring system disclosed in U.S. Pat. No. 3,872,301 employs two apertures 180° out of phase in a mask and separate photosensors. The outputs of the photosensors are differenced to obtain a position signal and added to provide a control signal to maintain the intensity of radiation constant. This system also has the advantage of not requiring a dedicated photosensor to monitor the intensity of the light source, but is uniquely dependent on the particular differencing technique for obtaining the position signal.

In many applications, it is desirable to continuously determine relative displacement (linear or angular) of a scale relative to an index position without an added photosensor being dedicated to monitoring of light source intensity, and with a minimum of photosensors. Using a scale having a transmission grating of, for example, 200 lines to the inch and a reticle with a section of the same grating as the scale, light passing to a photosensor through the reticle and scale from a source is modulated as the relative position of the scale over the reticle is changed. To determine position at any given time, cycles of the modulated output of the photosensor may be counted up and down for motion away from and toward an index position. To facilitate the determination of direction of motion, a second scale and reticle combination may be provided in phase quadrature with the first scale and reticle combination. The output signal of a second photosensor opposite the second reticle may then be compared with the output of the first photosensor for determining direction of motion. In either case, the rate of the cycles in the modulated outputs of the photosensors will provide speed information.

This arrangement of a transducer for position, speed and direction information utilizes only two photosensors. In addition to the two reticle photosensors, only one additional photosensor is required to determine an index position. For example, in the case of a linear scale, an index position at each end of the scale can be determined by providing a single bar at each end of the scale on a parallel transparent track. A single reticle slit positioned to illuminate a third photosensor will modulate the output of the third photosensor to provide a single pulse at each index position of the scale.

The usefulness of this indexed scale-reticle arrangement will depend upon having a relatively constant peak amplitude of the output signals, that are developed by the photosensors. Output signal peak amplitude must be predictable within certain limits as this signal is processed by electronic circuitry which cannot accommodate an extreme range of amplitude variation, or, for some applications, the position signal is used directly as the position feedback in a closed-loop servo-system, and the amplitude must be controlled in order that the gain of the servo-system can be predicted. Without this degree of predictability of gain within the servo-system, the servo-system may not achieve the desired sensitivity or position accuracy or it may become unstable.

The limit of predictability that can be achieved will depend upon the extent to which the light source intensity can be regulated. A control loop would provide optimum regulation, but the problem is to provide an optimum control loop without additional photosensors. A very tight control loop would, of course, include the photosensor that provides the position signal; otherwise, variations in the light detecting characteristics of the photosensor will cause variations in the position signal. However, the variations in the characteristics of some photosensors with temperature, age and other factors is at least an order of magnitude smaller than variations in the radiating characteristics of light sources and the variations in effective transmissibility of the optical path. This is particularly true in the case of light emitting diodes. Consequently, it is not as imperative that the actual position photosensor be included in a control loop to regulate the light source intensity. However, it is important that the means of detecting the intensity of the light source for use in the control loop be subjected to the same environment as the position photosensor, and that it experience light intensity variations that are of the same nature as that experienced by the position photosensor which result from variations of the effective transmissibility of the optical path.

In practical opto-electronic position transducers, the amount of light impinging on the photosensors departs from that of the ideal case. This is due to a variety of causes, and this variation from the ideal case may be treated as a variation in the effective transmissibility of the optical path of the transducer. A portion of these variations from the ideal is experienced in different amounts between different units of a given design. Further, within any given unit, variations will occur due to the nature of the practical elements employed in the optical path. In addition, degradation of the optical path may occur during actual use of the transducer due either to the environment in which the transducer is used or due to aging of the elements in the transducer.

By way of example, some of the causes of variation in the effective transmissibility are: changes in the optical density of any lenses and/or the scale and reticle of the system due to condensation of atmospheric contaminants; variations in the effective optical density of the scale, over the length of the scale, due to imperfections in the manufacture of the scale; and scattering of light from the light source due to dust and other particulate matter in the atmosphere in the optical path of the light. Regardless of whether the change in the effective transmissibility of the optical path is due to the use of the transducer in a given environment or caused by the nature of manufacture of the transducer elements, it is highly desirable to be able to regulate the light source intensity to provide compensation for these effects, in addition to compensating for any changes in the ability of the light source to maintain a constant light intensity. Further, if by design the photosensor that is within the control loop is subjected to the same range of temperature and other environmental effects as the photosensor which is used for producing the basic position signal, a near total compensation can be achieved.

OBJECTS AND SUMMARY OF THE INVENTION

An object of this invention is to provide means for detecting the intensity of the light in an opto-electronic position and/or velocity transducer for light source intensity regulation with a minimum number of photosensors required for position and/or velocity information and intensity regulation.

Another object is to provide light intensity regulation of a transducer for continually providing position information relative to at least one index position with a minimum of photosensors, including one for providing an index signal.

In accordance with a preferred embodiment of the invention, an opto-electronic position and/or velocity transducer is provided comprising a first member having a track of information (e.g., a transmission grating), and a second member (e.g., a slit or section of the same transmission grating) opposite the first member with a minimum of spacing necessary to permit relative motion between the two members, and means for detecting light transmitted through the track of information, and in response thereto, for producing a signal proportional to the light detected as the position of one member changes relative to the other. A transparent light amplitude control track on the first member is disposed alongside the information track. Light through a slit in the second member and through the light amplitude control track of the first member to a second photosensor, is employed as a regulating feedback signal to maintain the intensity of the light constant. When at least one index position bar is included in the second track, a low-pass filter is included in the feedback signal path. In that manner feedback control is bandwidth limited in order to avoid excessive amplitude excursions in the regulating feedback signal as an indexing bar eclipses the second member slit. An amplitude limiter is also included in the feedback signal path.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
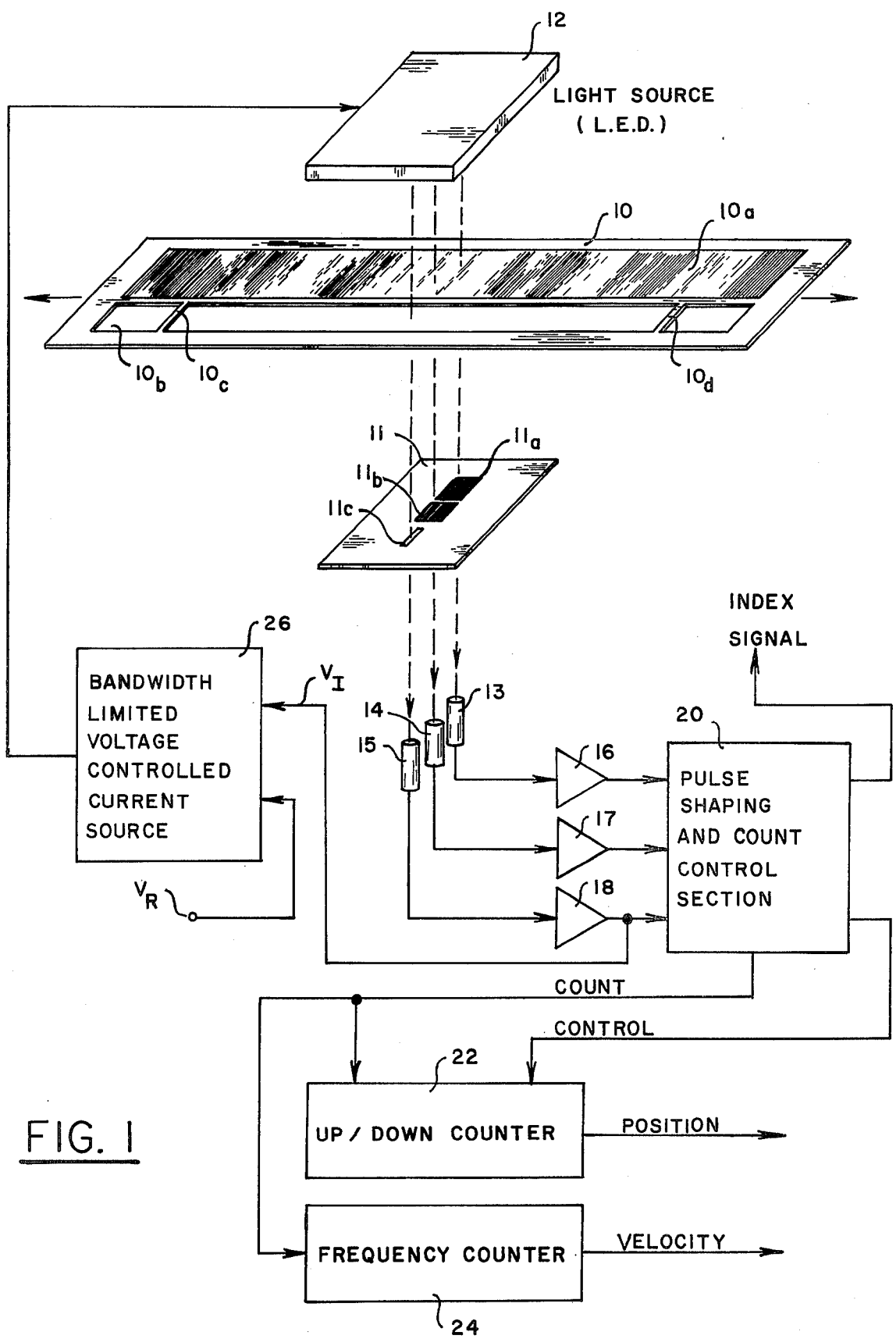
FIG. 1 is a schematic illustration of an opto-electronic transducer embodying the present invention.

Referring now to FIG. 1 of the drawings, there is illustrated schematically a position transducer comprising a scale 10, a reticle 11, a light source 12, and a pair of photosensors 13 and 14 for detecting position (and rate of change of position) of the scale 10 relative to the reticle 11. The reticle has two sections of transmission gratings (referred to hereinafter as Ronchi rulings) 11a, 11b, displaced one quarter of a cycle in a conventional manner. The pair of photosensors produce two position signals in phase quadrature from light transmitted through Ronchi rulings 10a of the scale and Ronchi rulings 11a and 11b of the reticle to the respective photosensors 13 and 14. The reticle also includes a slot 11c positioned over a third photosensor 15. Light from the source 12 passes through a second track 10b of the scale which is transparent, except for index bars 10c and 10d near each end of the scale when position indexing is desired.

The scale moves relative to the reticle in a direction normal to its Ronchi rulings, and parallel to the elongated area of the scale devoted to the Ronchi rulings 10a. The Ronchi rulings of the scale and reticle are parallel to each other. As the scale changes its position over the reticle, light detected by the photosensors 13 and 14 will vary from virtually zero to a maximum, but one quarter of a cycle (space) out of phase. These quadrature signals are coupled through amplifiers 16 and 17 to pulse shaping and count control section 20 of an up/down counter 22. The output of the photosensor 15 is also coupled to the pulse shaping and count control section 20 through an amplifier 18. The purpose of this third input signal to the control section is to initialize the up/down counter to zero when the indexing bar 10c crosses over the slit 11c from right to left, and to issue an index signal when either bar 10c or 10d crosses over the slit 11c from either direction. The quadrature signals from the photosensors 13 and 14 are used to determine the direction of motion and to control the counter to count up cycles of one of the quadrature signals when motion of the scale is to the left, and to count down when motion of the scale is to the right. The cycles counted for position are also counted by a frequency counter 24 to provide velocity information. The frequency counter may, for example, be comprised of a lossy integrator which provides a voltage output proportional to the cycle rate. It may also be comprised of a digital counter which is periodically reset, and a buffer register which stores the content of the counter each time the counter is reset such that the buffer output represents the average velocity during each period.

Regarding the details of the scale, which includes index bars 10c and 10d in an index track 10b, it should be noted that the index track is transparent throughout its length, except in the positions of the bars. The bars are preferably wider than the spacing selected for the Ronchi ruling, such as 2.031 times the Ronchi ruling space. The slit 11c of the reticle is made slightly less wide, such as twice the Ronchi ruling space, to assure total eclipse of the slit by the bars.

In practice, the scale and the reticle are formed on an ultra-flat plate of transparent material, such as glass, using photographic techniques. The entire surface of the glass is coated with a film of material that is opaque (or made opaque by exposure, as in the case of photographic emulsion) and then made selectively transparent using photographic techniques. In the case of photographic emulsion, the process is one of simply exposing and developing a pattern on the plate of glass. In the case of other opaque material, the selected transparent areas are etched using a photoresist mask that is exposed and developed as in the case of the photographic emulsion. In either case, the Ronchi rulings can be provided with a spacing of about $5.053 \times 10^{-3}$ inches ($\pm 100 \times 10^{-6}$ inches) for a scale typically about 3 inches long to be used as a position transducer for read/write heads in a magnetic disc recording system.

Figure 2:
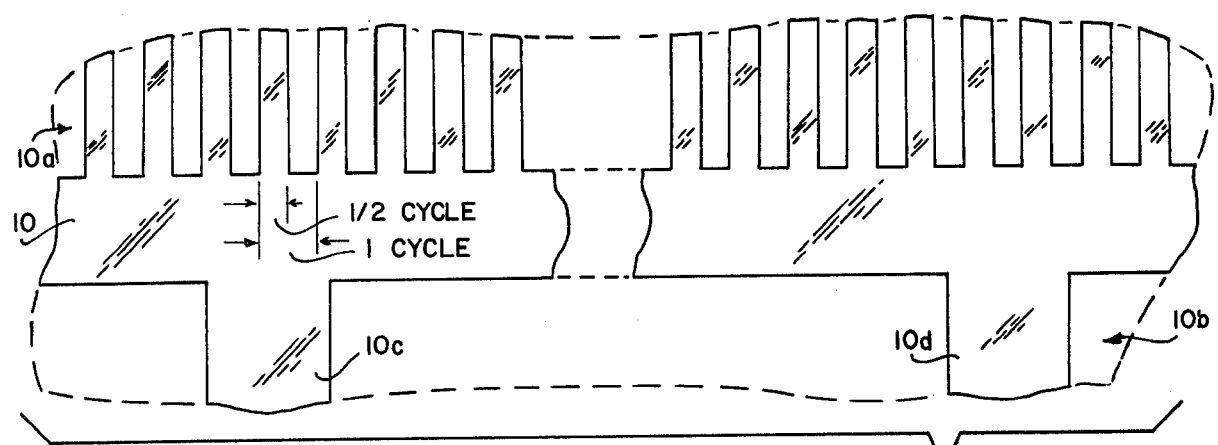
FIG. 2 is an enlargement of a portion of a scale in the transducer of FIG. 1.

FIG. 2 shows the spatial relationship of the alternately opaque and transparent lines of the Ronchi ruling in the first track 10a of the scale, and the indexing bars 10c and 10d in the second track 10b. It also shows the dimension of one "cycle" of the ruling, which is from one edge of an opaque line to the corresponding edge of an adjacent line.

Figure 3:
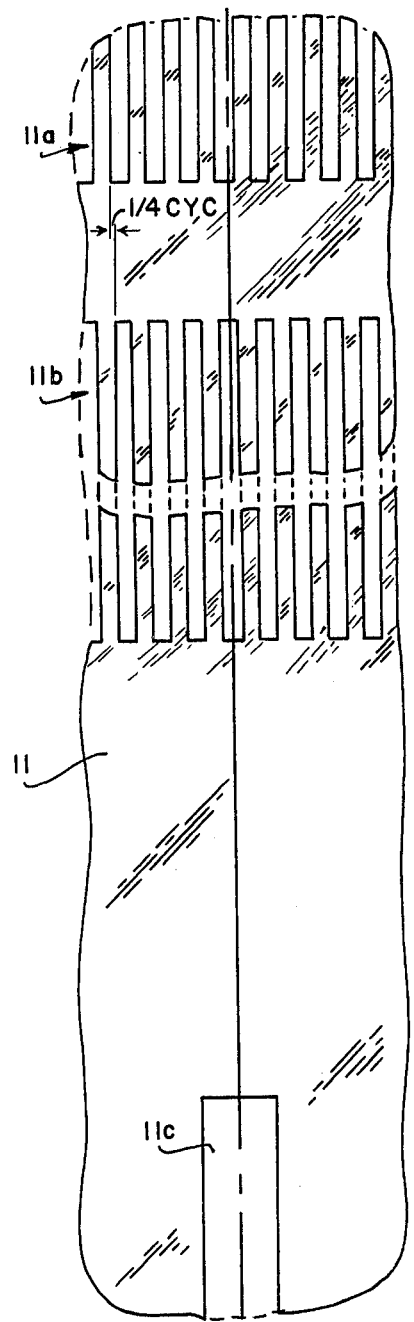
FIG. 3 is an enlargement of a portion of a reticle in the transducer of FIG. 1.

FIG. 3 shows the spatial relationship of the two Ronchi rulings 11a and 11b of the reticle, both to each other and to the slit.

In mounting the scale and reticle in a transducer assembly, the two are mounted facing each other to bring the actual Ronchi rulings of the two as close to each other as possible without allowing the scale to scrape the reticle. The scale then functions optimally as a shutter for the two sets of Ronchi rulings on the reticle to provide precise triangular waveforms from the photosensors 13 and 14 that are out of phase by precisely one quarter of a cycle as the scale moves relative to the reticle.

The peak amplitude predictability achieved in the relationship of the triangular waveforms to motion or position, depends upon a stable light source. If it varies due to temperature, power supply, age and other factors, the peak amplitude of the waveform will vary. Consequently, it is important to control the light source. This is particularly important in the case of a light-emitting diode used as the source since it is highly dependent on device temperatures, applied current and age. However, regardless of light source type, control may be important. That is accomplished by a control loop that includes the index photosensor 15 through a bandwidth limited voltage controlled current source 26. The basic control equation is:

$$I_{LS} = K_1 + K_2(V_R - V_I) \tag{1}$$

where $V_I$ is the index photosensor signal at the output of the amplifier 18, $K_1$ is an offset constant and $K_2$ is a constant of proportionality. Both constants may be determined empirically for any particular environment and operating requirements, or computed from theoretical analysis of the control loop. If the light source is controllable by voltage rather than current, than the current source shown in FIG. 1 is made a voltage source, and the control equation becomes:

$$V_{LS} = K_1 + K_2(V_R - V_I) \tag{2}$$

where $K_1$ and $K_2$ are again constants determined by a particular design of the control loop.

Since the index bar at each end of the scale will eclipse the slit 11c while the scale is in the index position, it is important that the system employing the scale for position and velocity control not stop in the index position, but instead drive through the index position to a position outside the index bars. The rulings of the scale are extended outside the index bars on both sides to permit velocity and position control. The eclipse of the slit 11c is then only momentary, causing a very short pulse at the output of the amplifier 18. To avoid excessive amplitude excursions in the control loop during this index pulse period, the voltage controlled current (or voltage) source is bandwidth limited, as shown in an exemplary embodiment illustrated in FIG. 4.

Figure 4:
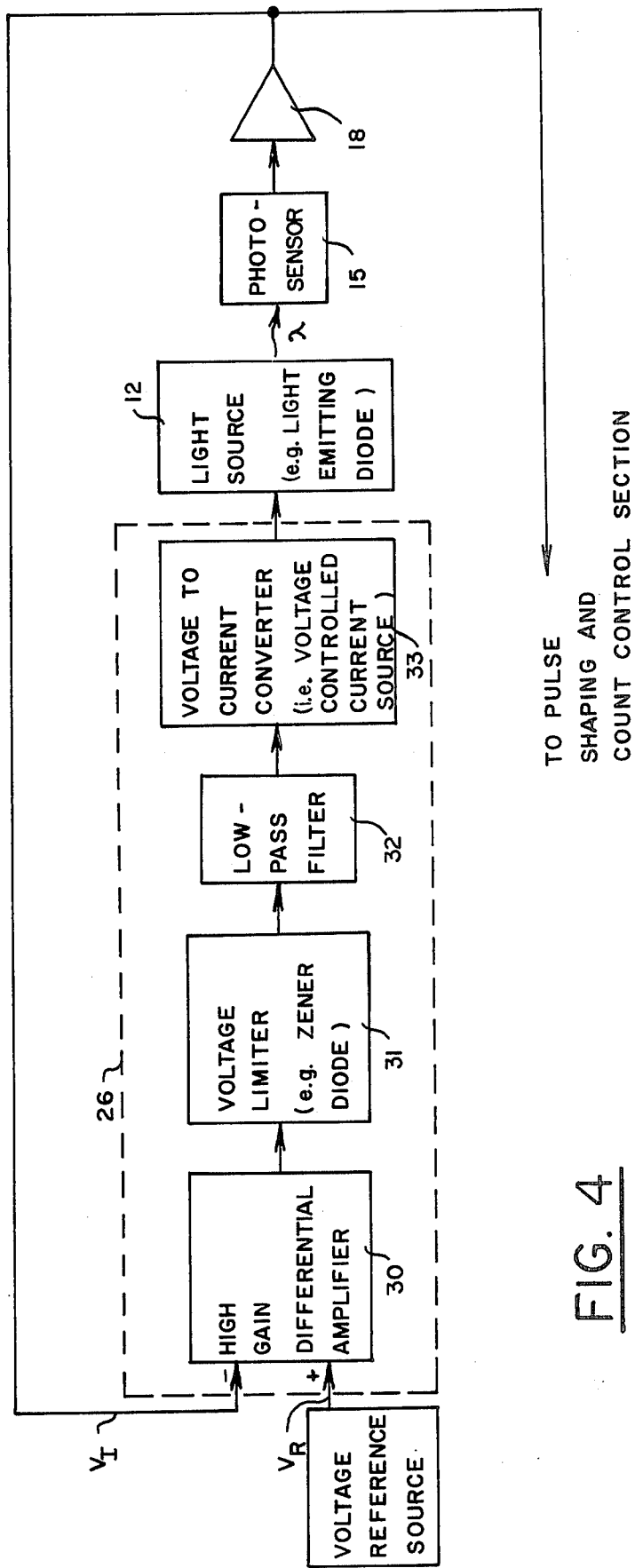
FIG. 4 is a block diagram of an exemplary embodiment of the present invention in the system of FIG. 1.

Referring now to FIG. 4, the bandwidth limited voltage controlled current source 26 of FIG. 1 is comprised of a high gain differential amplifier 30, a voltage limiter 31, a low-pass filter 32 and a voltage to current converter 33. The high gain differential amplifier 30, can be implemented with an integrated circuit operational amplifier, having differential inputs and a single-ended output.

The voltage limiter 31 is required if it is desired to provide a limit to control loop range of operation, such as might be appropriate if it is necessary to limit the maximum current applied to the light source. This limiting action can be accomplished by a Zener diode, for example, and in addition a voltage divider might be placed across the Zener diode to provide suitable scaling if desired. Alternately, a limiting action might be accomplished by designing saturation limiting into the voltage to current converter 33, or by choosing an amplifier for 30 that limits its output appropriately. Still other arrangements for the voltage limiter will occur to those skilled in the art.

The low-pass filter 32 is employed when it is desired to limit the bandwidth of the control loop such that it will respond only to perturbations below a certain frequency. If one or more index bars, such as 10c and 10d are desired, then aforementioned bandwidth limiting is appropriate.

The output voltage of the high gain differential amplifier 30, after processing as previously described, is converted to a proportional current by the voltage to current converter 33. This converter functions to provide a current output proportional to its input voltage. It therefore can be considered a voltage controlled current source.

Although a particular embodiment of the invention has been described and illustrated herein, it is recognized that modifications and equivalents may readily occur to those skilled in the art. Consequently, it is intended that the claims be interpreted to cover such modifications and equivalents.

The embodiment of the invention in which an exclusive property or privilege is claimed are defined as follows:

1. In an opto-electronic transducer having two members, one movable with respect to the other, and the other having at least one slit for transmission of light transmitted through said one member for determining at least one of two parameters consisting of position of said one member with respect to said other member and velocity of one with respect to the other, the combination comprising
   at least one track in said first member containing information,
   a controlled source of light stationary with respect to said second member,
   means stationary with respect to said second member for detecting light transmitted through said one track from said source, and for producing an analog signal of an amplitude related to the intensity of transmitted light detected,
   a second track in said first member disposed along side said one track for transmission of light from said source, the length of said second track being substantially equal to the length of said one track, said second track being transparent throughout substantially its entire length and having information only at positions of the operating region of said second track where said first member is not permitted to stop,
   means for detecting light transmitted through said second track from said source and through said slit in said other member and for producing a feedback signal of an amplitude related to the intensity of light detected, and
   control means including a low-pass filter responsive to said feedback signal for so controlling said source of light as to maintain the intensity of light from said source substantially constant.

2. The combination of claim 1 wherein said light source is a light emitting diode, and said control means is controlled current source for said light source.

3. The combination of claim 1 wherein said control means includes means for limiting the amplitude of said feedback signal.

4. The combination of claim 1 wherein said information in said second track is comprised of at least one opaque bar for providing indexing information of the position of said one member relative to the other member at one extreme of the operating region.

5. The combination of claim 4 wherein said control means includes means for limiting the amplitude of said feedback signal.

6. In an opto-electronic transducer having a scale and a reticle for determining change of position of said scale relative to said reticle, the combination comprising
   a first track on said scale having a transmission grating,
   a second track on said scale being transparent through substantially the entire length of said first track, said second track having information only at the extremes of the operating region of said transducer where said transducer is not permitted to stop,
   at least one section of transmission gratings on said reticle, said reticle gratings being of a width equal to corresponding gratings on said first track of said scale,
   a slit on said reticle in a position opposite said second track,
   a controlled source of light,
   a first photosensor positioned to receive light from said source through said first track of said scale and said one section of gratings on said reticle in order to produce a signal containing information as to said change of position,
   a second photosensor positioned to receive light from said source through said second track of said scale and said slit of said reticle in order to produce a feedback signal related to the intensity of light emitted by said source, and
   control means including a low-pass filter responsive to said feedback signal from said second photosensor for controlling said source of light to maintain substantially constant the intensity of light received by said second photosensor, whereby light received by said first track from said source is maintained substantially constant.

7. The combination of claim 6 wherein said control means includes means for limiting the amplitude of excursions of said feedback signal.

8. The combination of claim 6 wherein said information in said second track is comprised of at least one opaque bar for providing indexing information of the position of said reticle relative to said scale at one extreme of the operating region.

9. The combination of claim 8 wherein said control means includes means for limiting the amplitude of said feedback signal.

10. In an opto-electronic transducer having a scale and a reticle for determining change of position of said scale relative to said reticle, the combination comprising
- a first track on said scale having alternately opaque and transparent lines of equal width,
- a second track on said scale being transparent throughout and having at least one opaque bar at a position where said scale is not permitted to stop for indexing the position of said scale relative to said reticle,
- at least one set of alternately opaque and transparent lines on said reticle, said reticle lines being of a width equal to corresponding lines on said first track of said scale,
- a slit on said reticle in a position opposite said second track, said slit being of a width not greater than said bar,
- a controlled source of light,
- a first photosensor positioned to receive light from said source through said first track of said scale and said one set of lines on said reticle,
- a second photosensor positioned to receive light from said source through said second track of said scale and said slit of said reticle, and
- control means including a low-pass filter responsive to an output signal from said second photosensor for controlling said source of light to maintain substantially constant the intensity of light received by said second photosensor is maintained substantially constant.

11. The combination of claim 10 wherein said light source is a light emitting diode.

12. The combination of claim 11 wherein said means for producing said feedback signal includes means for limiting the amplitude of excursions of said output signal.

13. The combination of claim 11 wherein said means for producing said feedback signal includes a source of a constant reference signal and means for comparing said second photosensor output signal with said reference signal, and for producing said feedback signal in proportion to the difference between said photosensor output signal and said reference signal.

14. The combination of claim 13 wherein said means for producing said feedback signal includes means for limiting the amplitude of excursions of said output signal.

15. An opto-electronic transducer for determining position and velocity of one member with respect to another member comprising
- a controlled source of light,
- a scale with a transmission grating on a first track and an indexing bar near each end of a second track adjacent said first track, said second track being transparent, and said indexing bars being opaque and at positions where said scale is not permitted to stop,
- a reticle opposite said scale with a minimum spacing necessary to permit relative motion between said scale and said reticle, said reticle having two sections of the same transmission grating as in said first track, both of said sections being opposite said first track of said scale with one section offset spatially one quarter cycle with respect to the other section, and said reticle having a slit opposite said second track, both of said sections and said slit being positioned with respect to said light source to transmit light from said light source,
- two photosensors, a different one opposite each of said sections of said reticle, for producing quadrature signals from which relative position and velocity between said scale and reticle position and velocity between said scale and reticle can be determined, and a third photosensor opposite said slit of said reticle for producing an index signal, and
- coupling means for low-pass filtering and coupling said index signal to said controlled source of light to maintain the intensity of light transmitted through said sections of said grating in said reticle substantially constant.

16. The combination of claim 15 wherein said coupling means includes means for limiting the amplitude of said index signal bandwidth limited and coupled to said controlled light source.

* * * * *